Patented June 26, 1951

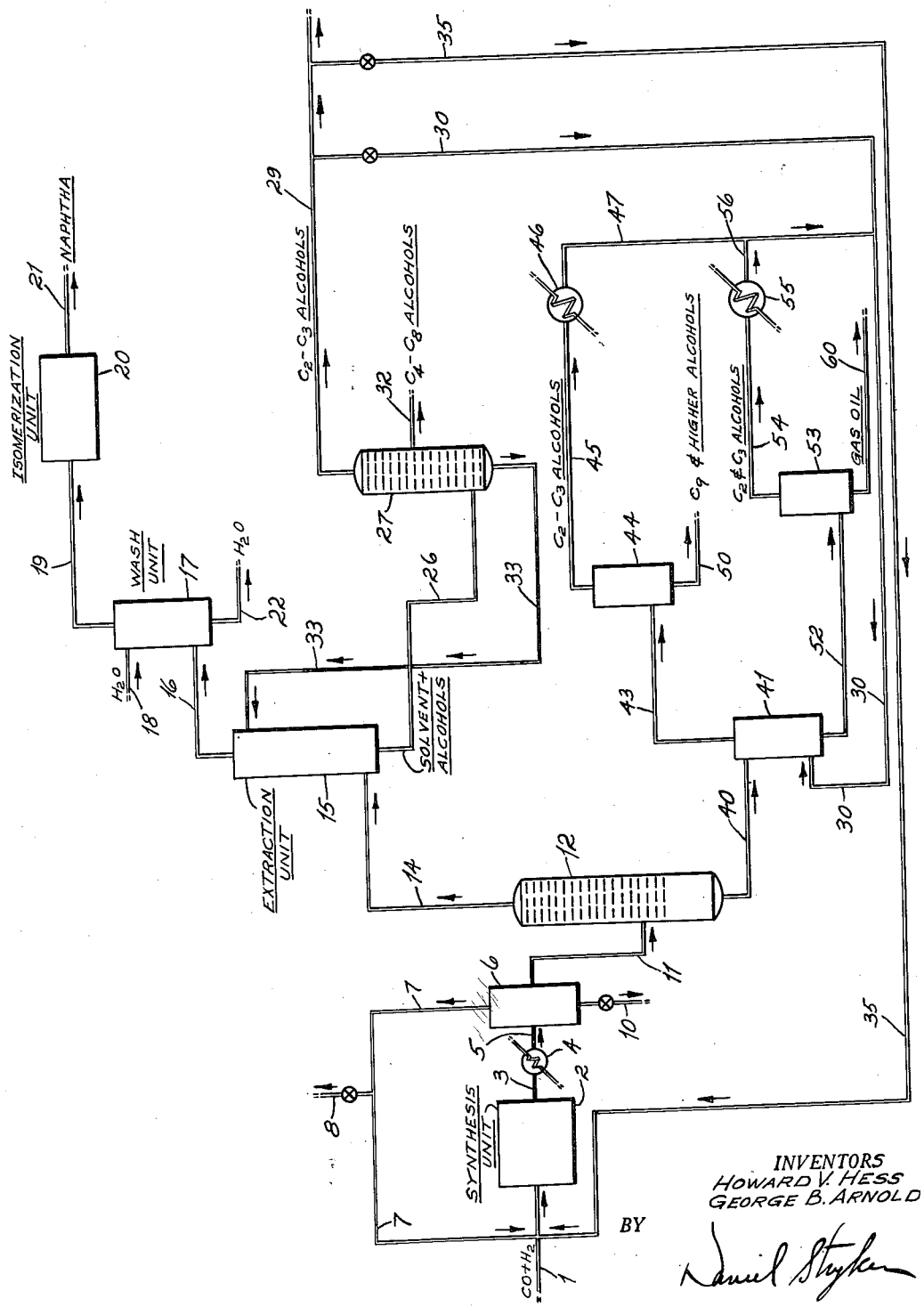

2,558,556

UNITED STATES PATENT OFFICE 2,558,556

PRODUCTION OF HYDROCARBONS AND OXYGENATED COMPOUNDS

Howard V. Hess, Beacon, and George B. Arnold, Glenham, N. Y., assignors to The Texas Company, New York, N. Y., a corporation of Delaware Application August 6, 1946, Serial No. 688,624

3 Claims. (Cl. 260—450)

This invention relates to the production of hydrocarbons and alcohols by the catalytic conversion of carbon monoxide and hydrogen.

In accordance with the invention, synthesis gas comprising carbon monoxide and hydrogen is reacted in the presence of a catalyst to produce a synthesis product containing hydrocarbons, water and oxygen-containing compounds, the major portion of hydrocarbons and oxygen-containing compounds usually comprising compounds having from one to 20 carbon atoms per molecule. The synthesis reaction is advantageously carried out with a synthesis catalyst of the iron type at a temperature in the range of about 450° to 700° F. and at superatmospheric pressure, for example, about 150 to 300 pounds per square inch. Under these conditions, the synthesis product mixture may comprise about two liquid volumes of water and one volume of normally liquid organic compounds. The oxygenated organic compounds comprising mainly alcohols may amount to from about 5 to 20 volume per cent of the total normally liquid synthesis product.

The temperature of the synthesis mixture is adjusted to about 200° to 350° F. at a pressure of about 150 to 300 pounds per square inch with the attendant formation of two liquid layers. One liquid layer comprises a hydrocarbon phase containing substantially all of the alcohols of more than two carbon atoms per molecule and a large proportion of ethyl alcohol. The other liquid layer comprises a water phase which contains the remainder of the alcohols. Small amounts of ketones and aldehydes may be present in both phases while the bulk of the acids produced in the catalytic conversion will be present in the water phase.

In addition to the formation of two liquid phases, a gas phase also separates from the products of the synthesis reaction at a pressure of about 150 to 300 pounds per square inch at a temperature in the range of 200° to 350° F. The gas phase comprises unreacted carbon monoxide and hydrogen, carbon dioxide and low boiling organic compounds such as methane and ethane. It is advantageous to recycle carbon dioxide as well as unreacted carbon monoxide and hydrogen to the synthesis reaction zone.

The liquid hydrocarbon phase is fractionated into two parts. One fraction boiling below about 400° F. at atmospheric pressure is obtained and is arbitrarily designated as a gasoline fraction, while the other fraction boils above about 400° F. at atmospheric pressure and is arbitrarily designated as a gas oil fraction. The gasoline fraction contains substantially all of the alcoholic products of conversion having more than two and less than 9 carbon atoms per molecule, in addition to a large proportion of the ethyl alcohol produced in the conversion. The gas oil fraction contains the remainder of the alcoholic products of conversion having from 9 to 20 carbon atoms per molecule.

The gasoline and gas oil fractions are separately subjected to solvent extraction with a selective solvent which is substantially immiscible with the gasoline or gas oil fraction at ordinary temperatures, for example, in the range of 70° to 150° F. As a result of the separate extractions, there are obtained two raffinate phases, both consisting essentially of hydrocarbons, one containing essentially hydrocarbons boiling below about 400° F. at atmospheric pressure and the other containing hydrocarbons boiling above about 400° F. There are also obtained two solvent-rich extract phases consisting essentially of alcohols dissolved in the solvents, one containing $C_2$ through $C_8$ alcohols and the other, $C_9$ through $C_{20}$ alcohols. Each of these phases is then subjected to further treatment.

The raffinate consisting essentially of gasoline hydrocarbons, with or without washing to remove traces of solvent, can be subjected to contact with a catalyst such as bauxite, alumina, fuller's earth or other alumina or silica adsorptive materials at a temperature in the range of 700° to 900° F. so as to effect mainly isomerization of olefinic constituents of the hydrocarbon mixture and removal of impurities. Treatment in this manner provides a gasoline with high anti-knock characteristics.

The raffinate consisting essentially of gas oil may be used directly as a fuel for Diesel engines or may be catalytically cracked to supply additional quantities of gasoline.

The solvent-rich phases are subjected to fractional distillation and other conventional operations, as will be described, so as to effect separation of alcohols from the solvent, the latter being recycled to the extraction step.

The water phase which is initially separated from the mixture of synthesis products and which contains a minor portion of the alcohols produced is advantageously subjected to distillation to recover the alcohols as binary water azeotropes.

As a solvent for the extraction of the $C_2$ to $C_8$ alcohols from the gasoline fraction, there is employed a solvent which has substantially complete solvent action on the alcohols and which is substantially immiscible with the gasoline hydrocarbon fraction at ordinary temperatures. Further, the selective solvent employed for the extraction of the alcohols from the gasoline fraction advantageously has a boiling point higher than the temperature which is used as the point of demarkation between the gasoline and gas oil fractions. Ethylene glycol, diethylene glycol and glycerol are examples of solvents which may be used.

To effect extraction of the $C_9$ to $C_{20}$ alcohols from the gas oil fraction, a solvent is chosen which has substantially complete solvent action upon these higher alcohols and which is also substantially immiscible with the gas oil hydrocarbons at ordinary temperatures. The boiling point of this selective solvent is advantageously lower than the temperature which constitutes the point of demarkation between the gasoline and gas oil fractions. Examples of selective solvents which have the desired characteristics are nitro-methane, nitro-ethane, methyl ethyl ketone, furfural, ethyl alcohol, isopropyl alcohol, or a mixture of ethyl and n-propyl alcohols obtained from the extract phase of the gasoline fraction extraction.

We have found that by effecting the initial separation of a water phase from the synthesis products at a temperature in the range of about 200° to 350° F. and at a pressure in the range of about 150 to 300 pounds per square inch, substantially all of the alcohols, particularly the $C_3$ and higher, remain in the hydrocarbon phase and only a small amount, mainly ethyl alcohol, remains in the water phase. Thus, the water phase separated from the synthesis products at a temperature of 200° F. and a pressure of 150 to 300 pounds per square inch contains about 1.0 to 2.0 weight per cent oxygenated compounds whereas that separated at room temperature and pressure contains at least about 6 to 8 weight per cent. The water phase separated at temperatures higher than 200° F. contains still less of the oxygenated compounds. This phenomenon has been described in a co-pending application Serial No. 673,882.

We have further found that fractionation of the alcohol-rich hydrocarbon phase into two parts, separate extraction of each of these parts and subsequent treatment to recover alcohols from the extraction solvents, provides a most efficient method of recovering substantially all of the alcohols.

In order to describe the invention in more detail, reference will now be made to the accompanying drawing.

As indicated in the drawing, carbon monoxide and hydrogen usually in the proportion of about two mols of hydrogen to one mol of carbon monoxide are obtained from a source not shown and passed through a conduit 1 to a conventional synthesis unit 2. In the conduit 1, the fresh charge of synthesis gas may be supplemented by the normally gaseous products of the conversion of synthesis gas.

In the synthesis unit 2, the reactants may be subjected to contact with a synthesis catalyst in the form of a fluidized mass of solid particles or powder. Preferably the catalyst contains iron as the hydrogenating metal although other synthesis catalysts using cobalt or nickel as hydrogenating metals may be used.

The synthesis reaction with an iron catalyst is usually carried out at a temperature in the range of about 500 to 700° F. and under a pressure of about 150 to 300 pounds per square inch. An iron catalyst which has proven particularly effective for synthesis of a mixture of hydrocarbons and oxygenated hydrocarbon derivatives contains about 96% iron, about 2 to 3% alumina and about 0.1 to 3% alkali metal oxides, such as potassium oxide.

An effluent stream comprising mainly reaction products leaves the synthesis unit 2 through a pipe 3 and is introduced into a cooler 4. In the cooler 4, the effluent stream is advantageously reduced to a temperature of about 200 to 240° F. without a substantial reduction in pressure. The total effluent then passes into a separator 6 through a pipe 5. In the separator 6, there is effected separation of synthesis effluent into 3 phases: one, a gas phase comprising mainly unreacted gas, carbon dioxide and normally gaseous hydrocarbons such as methane, ethane, propane, etc.; two, a hydrocarbon phase which is substantially free from fatty acids and which contains substantially all of the aliphatic alcohols having three or more carbon atoms per molecule plus a portion of ethyl alcohol and also small percentages of aldehydes and ketones; three, a water phase containing small percentages of ethyl alcohol in addition to small percentages of fatty acids and low boiling aldehydes and ketones. The synthesis product is substantially free from methyl alcohol.

The gas phase is withdrawn from the separator 6 through a pipe 7 through which at least a portion of the gas phase may be recycled to the synthesis unit 2. The pipe 7 leads to the conduit 1 through which the fresh synthesis feed is introduced into the synthesis unit 2. The non-recycled portion of the gas phase is discharged from the pipe 7 through a vent 8.

The water phase containing less than about 2% oxygenated compounds is withdrawn from the separator 6 through a pipe 10. This water phase contains a portion of the ethyl alcohol produced in the synthesis, almost all of the low molecular weight fatty acids produced therein and small percentages of low boiling aldehydes and ketones. This water phase may be distilled to recover an ethyl alcohol-water azeotrope boiling at 78.1° C. and containing 95% ethyl alcohol.

The hydrocarbon phase, containing the major portion of ethyl alcohol and substantially all of the higher alcohols of more than two carbon atoms produced in the conversion, passes from the separator 6 into a fractionating tower 12 through a pipe 11. The hydrocarbon phase is reduced to atmospheric pressure prior to introduction into the fractionating tower 12.

In the fractionating tower 12, the hydrocarbon phase is divided into two fractions; one boiling below about 400° F. at atmospheric pressure which we designate a "gasoline" fraction, and the other boiling above about 400° F. which we designate a "gas oil" fraction. The gasoline fraction contains the alcohols boiling below about 400° F. which includes the normal primary aliphatic alcohols having up to and including 8 carbon atoms. The gas oil fraction contains normal primary alcohols boiling above about 400° F. which are mainly $C_9$ to $C_{20}$ alcohols.

The gasoline fraction leaves the fractionating tower 12 through a pipe 14 and is introduced into an extraction unit 15 which advantageously comprises a vertical packed tower. In the extraction unit 15, the gasoline fraction is subjected to counter-current contact with a stream of a selective solvent such as ethylene glycol or diethylene glycol at a temperature of about 70 to 100° F. in the proportions of about ½ to 4 volumes of solvent per volume of hydrocarbon phase.

A raffinate or insoluble phase consisting essentially of gasoline hydrocarbons but retaining small amounts of solvent and alcohols is continuously withdrawn through a pipe 16 and conducted to a wash tower 17 wherein the hydrocarbons are subjected to counter-current washing with a stream of water introduced through a pipe 18 in the proportion of about 0.1 volume of water to 1.0 volume of hydrocarbons at atmospheric temperature. This washing effects substantially complete removal of residual solvent.

The washed gasoline hydrocarbons pass through a pipe 19 to an isomerization unit 20 wherein it is subjected to intimate contact with a solid finely divided catalyst such as alumina or bauxite at a temperature of about 800° F. so as to effect isomerization of the olefinic constituents of the gasoline hydrocarbons thereby effecting improvement in octane rating. There is obtained from the isomerization unit 20 through a pipe 21 a gasoline fraction of high anti-knock rating.

The wash water used to remove the final traces of solvent from the raffinate phase in the wash tower 17 is discharged therefrom through a pipe 22 and a concentrate of solvent may be obtained therefrom by distillation of water. The solvent concentrate may be then recycled to the extraction unit 15. Alternately this water wash may be discarded since the concentration of solvent present therein is relatively small.

Solvent or extract phase obtained in the extraction unit 15 is continuously drawn off through a pipe 26 to a fractionating column 27. This extract phase contains aliphatic alcohols ranging from 2 up through 8 carbon atoms per molecule.

In the fractionating column 27 the alcohols are separated from the solvent by distillation. Advantageously the alcohols undergo a preliminary fractional separation in the column 27. A fraction comprising the 2 and 3 carbon alcohols is taken off overhead through a pipe 29.

Through the pipe 29 this fraction comprising the $C_2$ and $C_3$ alcohols may be piped to storage or undergo further fractionation into ethyl and propyl alcohol. Advantageously, however, a portion of this $C_2$ and $C_3$ carbon alcohol fraction is employed as the selective solvent for the gas oil hydrocarbon fraction. To this end, part of the $C_2$—$C_3$ alcohol fraction is diverted from the pipe 29 through a pipe 30. The use of this fraction for the extraction of the $C_9$ and higher alcohols from the gas oil hydrocarbon fraction will be described in more detail later.

A portion of the $C_2$—$C_3$ alcohol fraction may also be recycled to the synthesis unit 2 through a pipe 35 which connects the pipe 29 with the pipe 1 which serves as a feed pipe for the synthesis unit 2. The inclusion of $C_2$—$C_3$ alcohols in the feed to the synthesis unit serves as a means of converting these alcohols into liquid hydrocarbons.

A fraction comprising the $C_4$ to $C_8$ alcohols is obtained from the column 27 through a pipe 32. This fraction may be subjected to further fractionation in order to separate it into individual alcohol components.

The solvent from which the alcohols have been distilled is withdrawn from the column 27 through a pipe 33 and is recycled to the extraction unit 15.

Returning to the fractionating column 12 in which the initial separation of the hydrocarbon product into a gasoline and a gas oil fraction is effected, the gas oil fraction boiling over about 400° F. is withdrawn from the column 12 through a pipe 40. The gas oil fraction is introduced into an extraction unit 41 which advantageously comprises a vertical packed tower.

In the extraction unit 41 the gas oil fraction is subjected to counter-current contact with a selective solvent for the dissolved alcohols present therein. As has been indicated previously a fraction comprising the $C_2$ and $C_3$ alcohols produced in the conversion is advantageously employed for the extraction of the $C_8$ and higher alcohols from the gas oil fraction. This countercurrent extraction is conducted at temperatures in the range of 70–100° F. and with proportions of about one-half to four volumes of solvent per volume of gas oil fraction. Ordinarily, a ratio of one volume of solvent to one volume of gas oil fraction is employed.

The $C_2$ and $C_3$ alcohol fraction is introduced into the lower portion of the extraction unit 51 through the pipe 30. As a result of the countercurrent contact of the gas oil fraction with the solvent, a solvent or extract phase is continuously drawn off through a pipe 43 and introduced into a still or evaporator 44. This solvent phase contains the $C_9$ and higher alcohols produced in the conversion dissolved in the solvent which comprises a mixture of $C_2$ and $C_3$ alcohols.

In the still 44 the solvent, more volatile than the extracted higher alcohol, is removed as a distillate through a pipe 45. After condensation in the cooler 46 this solvent phase is returned through a pipe 47 to the pipe 30 through which it is recycled to the extraction unit 41.

The residual liquid drawn off from the still 44 through a pipe 50 comprises anhydrous $C_9$ and higher alcohols. This fraction may be separated into individual alcohols by further fractionation.

The raffinate phase consisting essentially of gas oil hydrocarbons boiling over about 400° F. and retaining a small amount of solvent and higher alcohols is drawn off from the bottom of the extraction unit 41 through a pipe 52 and is introduced into a still or evaporator 53. The solvent still retained therein may be taken off overhead as a distillate through a pipe 54. After condensation of the distillate in the cooler 55, this solvent phase is introduced through a pipe 56 into the pipe 47 through which it is recycled to the extraction unit 41.

The residual liquid withdrawn from the still 53 through a pipe 60 comprises a hydrocarbon phase boiling over about 400° F. This gas oil fraction may be piped to storage through the pipe 60 or subjected to other conventional treatment such as catalytic cracking etc.

Ethylene glycol, diethylene glycol, and glycerol have been cited as examples of selective solvents for the extraction of alcohols from the hydrocarbon fraction boiling below about 400° F.; it is contemplated that other solvents may be used to effect this extraction, and among such compounds may be listed amines such as ethanol amine and ethylene diamine, and acids such as levulinic.

The selective solvents for the extraction of the $C_9$ and higher alcohols from the gas oil fraction boiling above about 400° F. have been enumerated previously but bear repetition at this point in order to emphasize that the invention is not limited to the use of the $C_2$ and $C_3$ alcohol fraction of the products for this purpose. Alternative solvents for the liquid extraction of alcohols from the gas oil fraction are nitrated hydrocarbons such as nitro ethane and nitro methane, ketones such as methyl ethyl ketone, and aldehyde such as furfural or low boiling organic acids such as acetic acid.

The synthesis reaction is advantageously effected with a fluidized mass of synthesis catalyst in solid particle form, although it is contemplated that the catalyst may be used in the form of a stationary bed, a moving bed, or a suspension of particles entrained in the reactants. While specific temperatures and pressures have been referred to it is contemplated that these will vary depending on what catalyst is employed and what particular products are desired. For example, the synthesis temperatures may range from 250–700° F. and reaction pressure may vary from atmospheric to about 1000 pounds per square inch.

Obviously many modifications and variations of the invention, as hereinbefore set forth, may be made without departing from the spirit and scope thereof and, therefore, only such limitations should be imposed as are indicated in the appended claims.

We claim:

1. In the conversion of carbon monoxide and hydrogen at a temperature of 250 to 700° F. and at a pressure between atmospheric and 1000 pounds per square inch into a mixture comprising hydrocarbons, water and oxygen-containing compounds which are mainly aliphatic alcohols, the improvement which comprises effecting separation of said mixture at an elevated temperature of about 200 to 350° F. and elevated pressure into a gas phase, a hydrocarbon phase containing substantially all of the $C_3$ and higher alcohols in addition to a substantial part of the ethyl alcohol produced in said conversion and a water phase containing a minor percentage of the alcoholic conversion products, fractionating said hydrocarbon phase into a gasoline fraction and a gas oil fraction, separating $C_2$ and $C_3$ alcohols from said gasoline fraction and using said $C_2$ and $C_3$ alcohols to extract oxygenates from said gas oil fraction.

2. The improvement according to claim 1 in which separation of the mixture into two liquid phases is effected at a pressure between 150 and 300 pounds per square inch.

3. The improvement according to claim 1 in which conversion of carbon monoxide and hydrogen is effected at a temperature between 450 and 700° F. in super-atmospheric pressure with an iron catalyst.

HOWARD V. HESS.
GEORGE B. ARNOLD.

REFERENCES CITED

The following references are of record in the file of this patent:

UNITED STATES PATENTS

| Number | Name | Date |
|---|---|---|
| 1,870,816 | Lewis | Aug. 9, 1932 |
| 2,410,642 | Farkas | Nov. 5, 1946 |
| 2,417,164 | Huber, Jr. | Mar. 11, 1947 |
| 2,476,788 | White | July 19, 1949 |

OTHER REFERENCES

Fischer, Conversion of Coal Into Oil, pub. by Ernest Benn, Ltd., London (1925), 241–6.

Koch, Brennstoff Chemie, vol. 16, 382–7 (1935).

U. S. Naval Tech. Mission in Europe (1945), pages 73–90; page 90 particularly pertinent.